US012613679B2

(12) United States Patent
Noble et al.

(10) Patent No.: US 12,613,679 B2
(45) Date of Patent: Apr. 28, 2026

(54) ACCESSIBILITY-AWARE DESIGN SERVICES

(71) Applicant: Capital One Financial Corporation, McLean, VA (US)

(72) Inventors: Lise W. Noble, Chapel Hill, NC (US); Daniel A. Gisolfi, Hopewell Junction, NY (US); Douglas Brian Scamahorn, Noblesville, IN (US); Andrew Bryan Smith, Apex, NC (US)

(73) Assignee: Capital One Financial Corporation, McLean, VA (US)

( * ) Notice: Subject to any disclaimer, the term of this patent is extended or adjusted under 35 U.S.C. 154(b) by 111 days.

(21) Appl. No.: 18/478,267

(22) Filed: Sep. 29, 2023

(65) Prior Publication Data

US 2025/0110700 A1 Apr. 3, 2025

(51) Int. Cl.
| | |
|---|---|
| *G06F 9/44* | (2018.01) |
| *G06F 8/20* | (2018.01) |
| *G06F 8/38* | (2018.01) |
| *G06F 9/445* | (2018.01) |
| *G06F 9/45* | (2006.01) |
| *G06F 9/451* | (2018.01) |
| *G06F 9/455* | (2018.01) |

(52) U.S. Cl.
CPC .................. *G06F 8/20* (2013.01); *G06F 8/38* (2013.01); *G06F 9/451* (2018.02)

(58) Field of Classification Search
CPC .............. G06F 8/20; G06F 8/38; G06F 9/451
See application file for complete search history.

(56) References Cited

U.S. PATENT DOCUMENTS

| | | | |
|---|---|---|---|
| 9,886,168 | B2 | 2/2018 | Sahasrabudhe et al. |
| 12,130,733 | B2 * | 10/2024 | Wolf ................... G06F 11/3604 |
| 2003/0097240 | A1 | 5/2003 | Atasoy |
| 2011/0249284 | A1 | 10/2011 | Seabright et al. |

(Continued)

FOREIGN PATENT DOCUMENTS

WO WO-2023101705 A1 * 6/2023 ......... G06F 3/04817

OTHER PUBLICATIONS

Venkatesh Potluri (Notably Inaccessible—Data Driven Understanding of Data Science Notebook (In)Accessibility), 2023, pp. 1-19 chrome-extension://efaidnbmnnnibpcajpcglclefindmkaj/https://arxiv.org/pdf/2308.03241 (Year: 2023).*

(Continued)

*Primary Examiner* — Mongbao Nguyen
(74) *Attorney, Agent, or Firm* — Lee Sullivan Shea & Smith LLP

(57) ABSTRACT

A computing system is configured to (i) receive, from a computing device, input data indicating a target accessibility compliance standard and initial design data for at least one visual interface design element, (ii) based on the target accessibility compliance standard, determine a set of operations to apply to the initial design data to generate accessibility-compliant design data for the at least one visual interface design element, the accessibility-compliant design data usable to produce, for the at least one visual interface design element, accessibility-compliant content, and (iii) apply the set of operations to the initial design data and thereby generate the accessibility-compliant design data.

14 Claims, 7 Drawing Sheets

(56) References Cited

U.S. PATENT DOCUMENTS

| | | | |
|---|---|---|---|
| 2018/0173505 A1 | 6/2018 | Yan | |
| 2021/0240451 A1 | 8/2021 | Schoppe et al. | |
| 2022/0121723 A1* | 4/2022 | Page | G06F 11/0784 |
| 2022/0129123 A1* | 4/2022 | Nair | G06F 8/38 |
| 2022/0366125 A1* | 11/2022 | Kim | G06F 40/14 |
| 2022/0366131 A1* | 11/2022 | Ekron | G06F 9/453 |
| 2023/0022493 A1* | 1/2023 | Madhugiri | G06F 16/986 |
| 2023/0368434 A1* | 11/2023 | Meersma | G06F 9/451 |
| 2024/0223712 A1* | 7/2024 | Mason | G06V 10/60 |
| 2025/0013697 A1* | 1/2025 | Estoesta | H04L 67/02 |
| 2025/0085937 A1* | 3/2025 | Fong | G06F 8/38 |

OTHER PUBLICATIONS

Hristo Hristov, A Model for Designing Accessible Color and Contrast for Users with Visual Deficiency and Color Blindness, 2022, pp. 1-7. https://ieeexplore.ieee.org/stamp/stamp.jsp?tp=&arnumber=10019637 (Year: 2022).*

International Searching Authority. International Search Report and Written Opinion issued in International Application No. PCT/US2024/048470, mailed on Jan. 3, 2025, 9 pages.

* cited by examiner

430

| Shade Level | Lightness Value Range |
|---|---|
| 0 | .9 to 1.0 |
| 100 | .8 to .9 |
| 200 | .7 to .8 |
| 300 | .6 to .7 |
| 400 | .5 to .6 |
| 500 | .4 to .5 |
| 600 | .3 to .4 |
| 700 | .2 to .3 |
| 800 | .1 to .2 |
| 900 | 0 to .1 |

FIG. 4

ACCESSIBILITY-AWARE DESIGN SERVICES

BACKGROUND

A wide range of impairments, such as vision impairments, hearing impairments, learning impairments, motion impairments, cognition impairments, etc., prevent billions of people globally from accessing and interacting with physical and digital content that is socially and economically necessary. The demand for inclusive content that provides accessibility to people with such impairments is rising, as is the need of content creators for tools to consistently generate inclusive, accessible content.

Overview

Disclosed herein is new technology that involves the use of accessibility-aware, atomic design services for visual interface design that include pre-encoded logic for satisfying one or more accessibility compliance standards.

In one aspect, the disclosed technology may take the form of a method to be carried out by a computing platform that involves (i) receiving, from a computing device, input data indicating a target accessibility compliance standard and initial design data for at least one visual interface design element, (ii) based on the target accessibility compliance standard, determining a set of operations to apply to the initial design data to generate accessibility-compliant design data for the at least one visual interface design element, the accessibility-compliant design data usable to produce, for the at least one visual interface design element, accessibility-compliant content, and (iii) applying the set of operations to the initial design data and thereby generating the accessibility-compliant design data.

In some example embodiments, the input data further includes a target compliance level for the target accessibility compliance standard.

Further, in example embodiments, the input data further includes an indication of at least one user impairment, where the accessibility-compliant design data is usable to produce, for the at least one visual interface design element, accessibility-compliant content for the at least one user impairment.

In such an embodiment, the at least one user impairment comprises one or more of a vision impairment, a hearing impairment, a learning impairment, a motion impairment, or a cognition impairment.

Further yet, in example embodiments, the accessibility-compliant design data comprises a cascading style sheet (CSS) file or a javascript object notation (JSON) file.

Still further, in some example embodiments, applying the set of operations to the initial design data and thereby generating the accessibility-compliant design data may involve generating the accessibility-compliant design data that is usable to produce accessibility-compliant visual content for both (i) a light theme and (ii) a dark theme.

Still further, in some example embodiments, the method may also involve determining that the initial design data for the at least one visual interface design element is not compliant with the target accessibility compliance standard, and where applying the set of operations to the initial design data and thereby generating the accessibility-compliant design data involves updating the initial design data for the at least one visual interface design element to be compliant with the target accessibility compliance standard.

Still further, in some example embodiments, applying the set of operations to the initial design data and thereby generating the accessibility-compliant design data may involve using the initial design data for the at least one visual interface design element to derive additional design information for one or more additional visual interface design elements.

Still further, in some example embodiments, the method may also involve producing the accessibility-compliant content.

In yet another aspect, disclosed herein is a computing system that includes a network interface for communicating over at least one data network, at least one processor, at least one non-transitory computer-readable medium, and program instructions stored on the at least one non-transitory computer-readable medium that are executable by the at least one processor to cause the computing system to carry out the functions disclosed herein, including but not limited to the functions of one or both of the foregoing methods.

In still another aspect, disclosed herein is a non-transitory computer-readable medium provisioned with program instructions that, when executed by at least one processor, cause a computing system to carry out the functions disclosed herein, including but not limited to the functions of one or both of the foregoing methods.

One of ordinary skill in the art will appreciate these as well as numerous other aspects in reading the following disclosure.

BRIEF DESCRIPTION OF THE DRAWINGS

FIG. 4 depicts an example chart usable by an accessibility-aware design service for determining light mode and dark mode color shades.

DETAILED DESCRIPTION

Figure 1:
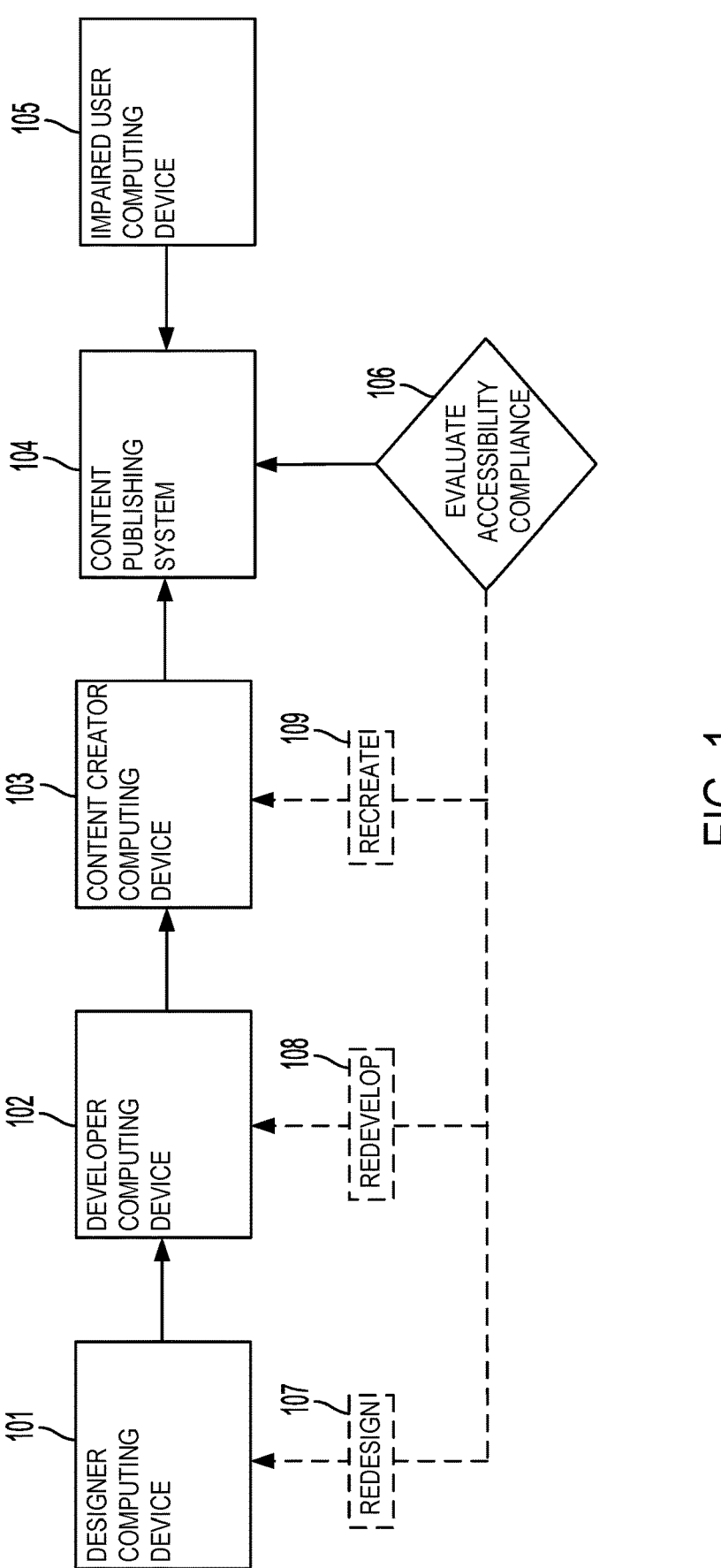
FIG. 1 is a simplified block diagram showing logical entities involved in creating accessibility-compliant content.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

Web accessibility, also sometimes referred to as e-accessibility, pertains to the design of websites, mobile applications, and other digital media content in a way that does not present barriers of access to people with disabilities or disorders. The types of disabilities and disorders, collectively referred to herein as impairments, that may be considered in this regard may take various forms. As some non-exhaustive examples, a person might have a visual impairment that affects his or her ability to see (e.g., color-blindness), an auditory or hearing impairment that affects his or her ability to hear, a learning impairment that affects his or her ability to learn in certain contexts (e.g., dyslexia), a motor impairment that affects his or her ability to perform coarse and/or fine motor functions (e.g., manipulating a mouse and/or keyboard), a motion impairment that affects his or her sensitivity to visual motion and/or repetitive patterns, amount numerous other examples.

The types of impairments noted above and the resulting lack of access that impaired people may have to certain inaccessible web-based content may negatively impact the quality of life for large groups of people in today's digital age. By some estimates, over a quarter of the world's population (i.e., at least 2.2 billion people) suffer from some form of visual impairment, and over half (i.e., approximately 5 billion people) use the internet and social media in some form. There are negative economic effects associated with such impairments as well. For example, vision impairments alone present a substantial global financial burden, with the global cost of productivity losses associated with vision impairment estimated to be US $411 billion annually.

To assist designers and content creators with the design and creation of web-based content that is accessible to people with impairments like those noted above, various standards have been developed. One prominent example is the Web Content Accessibility Guidelines (WCAG) (e.g., WCAG version 2.1), published by the Web Accessibility Initiative (WAI) of the World Wide Web Consortium (W3C), which provides a set of principles, guidelines, and success criteria that can be used to evaluate the accessibility of content. With respect to the success criteria, the WCAG 2.1 standard provides multiple levels of conformance (i.e., levels A, AA, and AAA, with increasingly stringent requirements) that can be achieved by satisfying the success criteria associated with each given level.

The WCAG 2.1 success criteria take various forms and may correspond to the design of visual elements in a way that has the effect of addressing the accessibility challenges associated with one or more different types of impairments. As one example, the success criteria may designate a minimum contrast level for different types of visual content, (e.g., text, buttons, etc.), where higher conformance levels have a higher minimum contrast level. As another example, the success criteria may designate a minimum target size (e.g., in pixels) for pointer inputs, where higher conformance levels have a higher minimum target size. As yet another example, the success criteria may require that users are able to pause, stop, or hide certain types of moving, blinking, or scrolling content. Numerous other examples of success criteria from WCAG 2.1 and other accessibility design standards are also possible.

Some governmental agencies and businesses worldwide have embraced accessibility standards and require compliance with a given WCAG 2.1 level for the designers and creators of their own web-based content. However, implementation of WCAG 2.1 and similar guidelines in the design and creation of web-based content remains a complex undertaking and attaining accessibility-compliance is challenging. Consequently, many current content creation workflows include little or no consideration of accessibility design, and the resulting content created by such workflows is often not accessibility-compliant in various ways. Further, many content creation workflows that do consider accessibility design do so in a post-hoc manner, evaluating already-created content and then adjusting the content as necessary to try to achieve some degree of accessibility-compliance.

A simplified example of this type of arrangement is shown in FIG. 1, which depicts a block diagram of the logical entities and operations that may be involved in a typical content creation workflow. At a high level, FIG. 1 may include a first computing device 101 that corresponds to a designer, a second computing device 102 that corresponds to a developer, a third computing device 103 that corresponds to a content creator, a fourth computing device 104 that corresponds to a content publishing system, and a fifth computing device 105 that corresponds to an impaired user.

In general, the designer may, via the first computing device 101, define consistent design language components and styles (e.g., colors, fonts, shapes, spacing, etc.) that will be used for the content that is to be created. Thereafter, the developer may, via the second computing device 102, implement the design language defined by the designer using software systems (e.g., interface design tools) to render content components such as buttons, menus, etc. in accordance with the design language. The content creator may then, via the third computing device 103, produce web-based content (e.g., a web page, a mobile application, etc.) using the content components rendered by the developer and then publish the created content to the fourth computing device 104 corresponding to the content publishing system (e.g., a web-hosting service, an app store, etc.). An impaired user may then, via the fifth computing device 105, access the published content.

It should be noted that FIG. 1 illustrates just one example arrangement of users and computing devices that might make up a content creation workflow and that numerous variations are possible. For example, the content creation workflow may include additional intermediate computing devices and users that are not shown. Further, any of the activities noted above may be performed by the same user (e.g., the developer and the content creator may be the same person) or by multiple users (e.g., there may be multiple designers, developers, and/or content creators. Similarly, any combination of the computing devices in FIG. 1 might be represented by a single device or may take the form of multiple computing devices and/or computing systems. In particular, the fourth computing device 104 corresponding to the content publishing system may take the form of one or more computing systems within a distributed computing network.

As depicted in the example shown in FIG. 1, many content creation workflows do not introduce any evaluation of accessibility compliance until after the content is already created, as represented by logical block 106. In this regard, any one of the computing devices shown in FIG. 1 or a separate computing device may perform an audit of the published content by comparing it against the success criteria of WCAG 2.1 (or a similar standard) to determine what level of compliance, if any, the content satisfies.

If the required success criteria are not satisfied, one of more of the designer, the developer, and/or the content creator may be required to revisit their respective portions of the content creation workflow, depending on which success criteria were not satisfied and the specific reason(s) why they were not satisfied. For instance, the developer may be required to redevelop, at block 108, certain components of the content in an accessibility-compliant way (e.g., increasing contrast for certain items by choosing a different color from the design language color palette, increasing the size of certain target input areas, etc.), which must then be recreated, at block 109, by the content creator. Additionally, or alternatively, it may be determined that the designer may need to redesign, at block 107, certain elements of the design language to meet some success criteria (e.g., by selecting different colors, fonts, spacing, etc.). Moreover, many of the changes discussed above may have a cascading effect on other elements of the already-published content, which may require further re-work, increased time and cost, and so on.

Still further, the challenges above are multiplied in situations where it is desired to present content according to more than one visual theme using the same design language. As one example, some content providers generate content that can be viewed in both a light theme (sometimes referred to as light mode), where relatively darker elements are presented against a light background, and a dark theme (sometimes referred to as dark mode), where relatively lighter elements are presented against a dark background. As a result, many visual aspects of the content may change when switching between these two themes such that content that is accessibility-compliant in a light theme may no longer be compliant in a dark theme. As just one example, the contrast between various elements of the content may be different, and thus the success criteria related to contrast may need to be re-evaluated, potentially leading to the re-work noted above.

Accordingly, it will be appreciated that not only is achieving accessibility-compliance with WCAG 2.1 and similar success criteria complex, but it can also be difficult or impossible to achieve by a single participant within the logical flowchart of FIG. 1. For these reasons, and in the absence of any requirement for most web-based designers and content creators to adhere to a specific set of guidelines, widespread adoption of accessibility-compliant standards like WCAG 2.1 for the creation of web-based content remains relatively low.

In view of these and other challenges associated with existing approaches to designing and creating accessibility-compliant content, disclosed herein are new techniques that involve the use of accessibility-aware, atomic design services that include pre-encoded logic for satisfying one or more accessibility compliance standards, such as WCAG 2.1. Based on some initial design data provided by a designer (e.g., a primary color, etc.), one or more accessibility-aware design services may perform the necessary calculations to generate accessibility-compliant design data that can be used to produce content that meets an accessibility standard specified by the designer.

Moreover, the accessibility-compliant design data that is generated by the accessibility-aware design services is generated such that it is usable in combination with other elements of the content in a compliant way, and is systematically extendible throughout the content while continuing to meet the desired accessibility standards. To facilitate these additional benefits, the accessibility-aware design services discussed herein may be used in conjunction with a set of atomic design principles.

Figure 2:
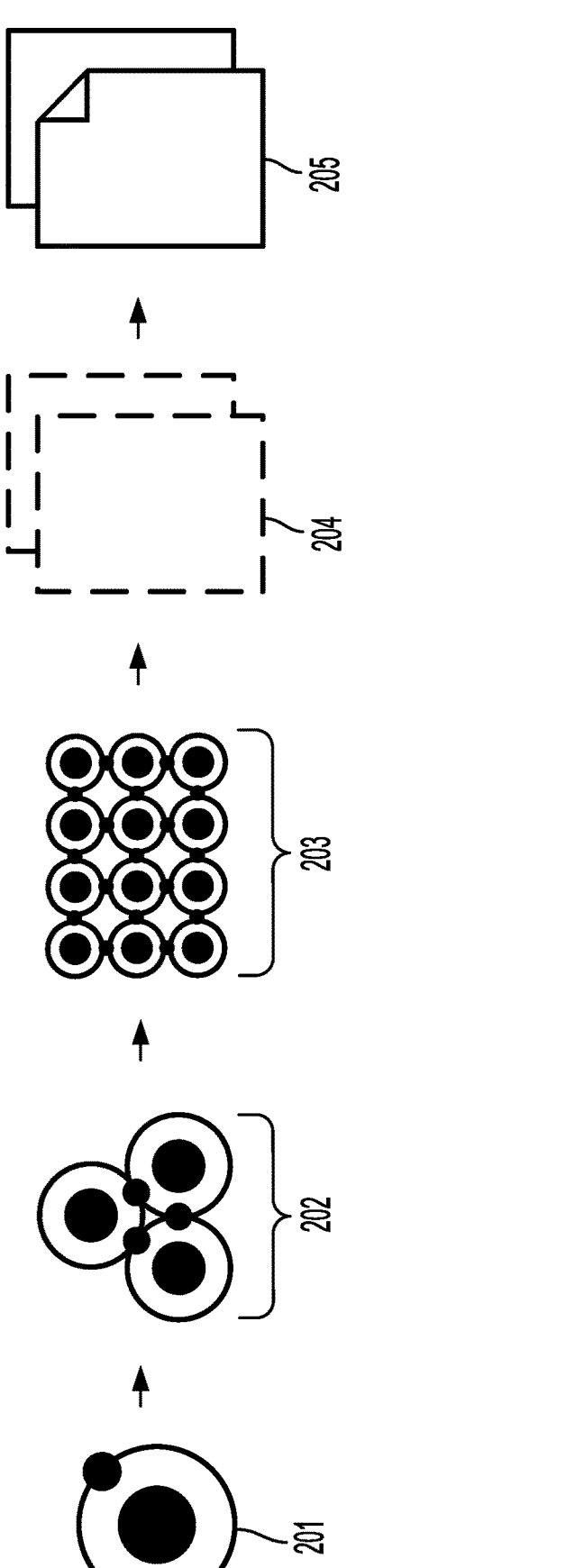
FIG. 2 is a schematic diagram illustrating components of an atomic design methodology, according to an example implementation.

In general, atomic design refers to a methodology whereby the elements of the content to be produced (e.g., a web-based interface) are broken down into their most fundamental building blocks. These building blocks can then be designed and thereafter combined into more complex components and scaled in a consistent way. Typically, there are five levels of complexity in atomic design, a schematic example of which is shown in FIG. 2. First, "atoms" 201 describe the most fundamental aspects of a design that cannot be broken down any further, and include elements such as colors and fonts. "Molecules" 202 are the next level and are made up of groups of atoms in combination. For instance, in the context of visual interface design, molecules take the form of relatively simple interface elements such as buttons and form labels. At the next level, "organisms" 203 consist of groups of molecules and/or atoms joined together to form more complex portions of an interface, some examples of which include sidebars, forms, and popups. Next, "templates" 204 describe groups of organisms that are assembled to establish the structure of the eventual content that will be produced, although templates themselves do not include the final content and are often populated with placeholder content. Finally, "pages" 205 refer to a specific instance of a template that includes the final content to be rendered.

It should be noted that the name of the last level of atomic design, "pages," corresponds to the context in which atomic design methodology was first introduced—namely webpage design. However, the need for accessibly-designed content is not limited to webpage design, nor even digital interface design. Rather, the design approach discussed herein can be used for any content that is to be rendered and potentially consumed by an impaired person. This may include non-webpage based content, such as mobile applications, but also physical content such as restaurant menus, tickets, credit cards, identity documents, etc. Similarly, although WCAG 2.1 is a digitally-focused standard, many of the principles, guidelines, and success criteria are directly translatable to the rendering of physical content. Accordingly, the last level of atomic design as applied herein for accessibility may alternatively be referred to as "instruments" 205 and may encompass content that is rendered either digitally or physically.

Utilizing the atomic design methodology noted above in the context of accessibility, the accessibility-aware design services discussed herein may be pre-encoded with logic for satisfying one or more accessibility compliance standards at the level of atoms and molecules. Accordingly, accessibility-compliant atoms and molecules may be combined to form compliant organisms and eventually compliant templates for the eventual instruments. In this way, accessibility-compliance may consistently scale throughout the overall design of the content.

As one illustrative example, a designer may utilize an accessibility-aware design service that is encoded with logic for calculating light mode and dark mode color shades. The designer may provide the service with initial design data indicating a primary color that will be used for the content. Further, the designer may specify that WCAG 2.1 compliance level AA should be satisfied. Based on this initial design data, the design service may calculate a set of shades (e.g., from lighter to darker) for the primary color by incrementally adjusting the color's lightness value. The service may then determine, for each determined shade of the primary color, whether light or dark text has a higher contrast against the given shade. If the selected text style (i.e., light or dark) provides a sufficient contrast ratio to meet WCAG 2.1 compliance level AA (i.e., a contrast ratio of 4.5:1), the text style is designated as the "on-color" for the given shade (i.e., the color of any element that will appear on top of the given shade). If the text style with the highest contrast does not meet the minimum WCAG 2.1 contrast ratio, the shade is iteratively lightened (for dark text) or darkened (for light text) until the contrast ratio is satisfied. Numerous other examples are also possible, some of which will be discussed in further detail below.

By combining the principles of atomic design with the principles and guidelines of accessibility standards such as WCAG 2.1, designers and content creators can easily and efficiently produce accessibility-compliant content that improves the quality of life for impaired people, recaptures some of the economic loss that would otherwise result from impaired people being unable to access the content, and beneficially reduces the content owner's risk (e.g., liability risk) associated with the content being non-compliant.

Figure 3:
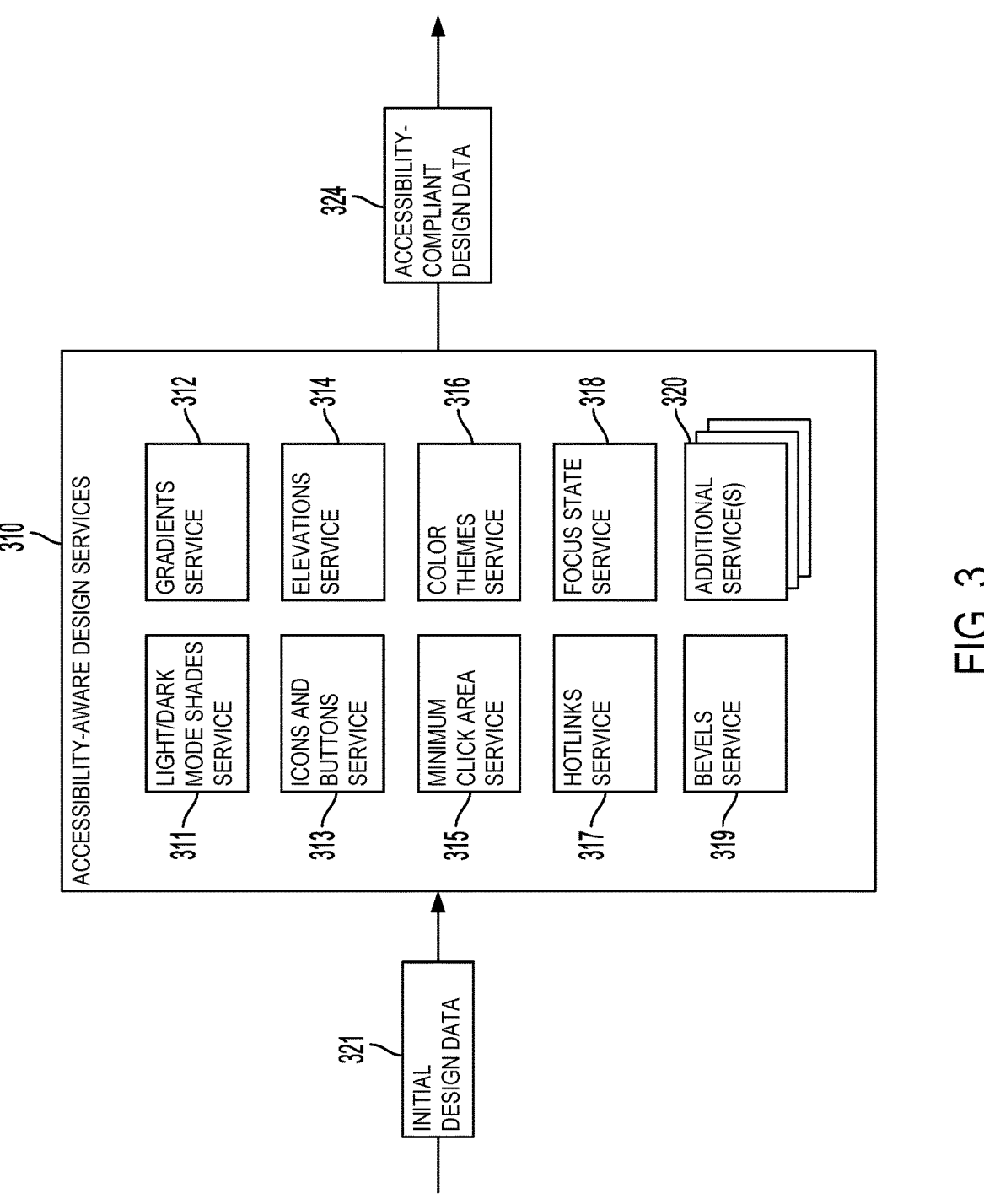
FIG. 3 is a simplified block diagram showing an example computing platform that hosts an example set of accessibility-aware design services.

The accessibility-aware design services discussed above may be provided in various ways. One example is shown in FIG. 3, which depicts a simplified block diagram of an example computing system 310 that hosts an example set of accessibility-aware design services that each correspond to a different atomic design element. In FIG. 3, each service takes the form of a subsystem of the overall computing system 310, although other arrangements are also possible. At a high level, each subsystem of the computing system 310 may be configured to receive as input some initial design data 321 and generate as output accessibility-compliant design data 324. Although the initial design data 321 is illustrated in FIG. 3 as being an external input to the computing system 310 (e.g., provided by a designer), in some cases a first subsystem (e.g., running an atom-generation service) may produce accessibility-compliant design data 324 that is used as initial design data 321 by a second subsystem (e.g., running a molecule-generation service). The pictured subsystems, which will be discussed in further detail below, include a first subsystem 311 that runs a light and dark mode shade service, a second subsystem 312 that runs a gradients service, a third subsystem 313 that runs an icons and buttons service, a fourth subsystem 314 that runs an elevations service, a fifth subsystem 315 that runs a minimum click area service, a sixth subsystem 316 that runs a color themes service, a seventh subsystem 317 that runs a hotlinks service, an eighth subsystem 318 that runs a focus state service, and a ninth subsystem 319 that runs a bevels service. Various other subsystems 320 are also possible and may run other accessibility-aware design services corresponding to other atomic design elements.

In practice, the computing system 310 may be implemented using various different techniques. For example, the computing system 310 may be implemented in part using a service-oriented architecture (SOA) where one or more of the subsystems communicate via an enterprise service bus (ESB). As another example, the computing system 310 may be implemented in part using a microservices architecture where one or more of the subsystems are deployed in containers and communicate using respective APIs. As yet another example, one or more of the subsystems shown in FIG. 3 may utilize a serverless architecture where the given subsystem is implemented as a set of cloud-based functions that may only be run when another subsystem accesses its API. As suggested above, the computing system 310 may integrate aspects of any of these various architectures, among others, in any combination.

The physical instantiation of the software subsystems included as part of the computing system 310 may also take various forms. In this regard, it should be noted that the physical hardware (e.g., servers, processors, communication interfaces, etc.) that makes up the subsystems of the computing system 310 might not be organized along the same lines as the individual subsystems. For example, a given subsystem may be collectively implemented by two or more physically distinct computing systems. Conversely, a single computing system might implement two or more logically separate subsystems (e.g., within separate containers or virtual machines) using the same physical hardware. Further, each software subsystem may include a network-accessible interface that allows other computing devices, systems, and/or subsystems-both internal and external—to access it over a network. A given subsystem's network-accessible interface may take various forms, such as an application programming interface (API), among other possibilities depending on the implementation. Some of the structural components of the computing systems(s) that might constitute the computing system 310 are discussed further below in relation to FIG. 6.

Beginning with subsystem 311, a light and dark mode shades service ("shades service") may be provided. At a high level, the light and dark mode shades service is an atom generation service that, given an indication of an initial input color from a designer, applies a set of logical instructions for creating ten light mode shades for the input color, ten dark mode shades for the input color, and a corresponding on-color for each shade that meets a designated accessibility guideline. For example, WCAG 2.1 requires an on-color contrast ratio of 4.5:1 to meet conformance level AA and a contrast ratio of 7:1 to meet conformance level AAA. In this regard, the desired conformance level may form part of the input data that is provided by the designer and the service may determine the required contrast ratio to use.

In addition, the shades service of subsystem 311 also considers that each dark mode shade needs to have a saturation rate of 0.5 or less while maintaining the required contrast ratio with its respective on-color. Further, in dark mode, white text has an opacity of 0.6, which increases the readability.

Each shade of the input color may be determined in various ways for both light mode and dark mode. According to one example, the shades service may first determine the lightness value of the input color based on the HSL (hue, saturation, lightness) representation of the color. In this regard, the shades service may need to convert the input color to an HSL representation if it was provided as input by the designer according to a different representation (e.g., HEX color or RGB). Once the lightness value of the input color is determined, the shades service of subsystem 311 may associate the color with a shade level according to the example chart 430 shown in FIG. 4. For instance, an input color with an HSL lightness value of 0.32 would be associated with a shade level of 600.

The shades service may then calculate a multiplier to be used for determining each of the shade levels of the input color for light mode. The multiplier (M) may be based in the input color's lightness value (LIGHTNESS_VALUE) and shade level (SHADE_LEVEL) and may be calculated according to the following equation:

$$M = \text{LIGHTNESS\_VALUE} - (900 - \text{SHADE\_LEVEL})/1000 \quad \text{(Eq. 1)}$$

Once the multiplier is determined, the individual lightness values for each light mode shade (LM_LIGHTNESS) can be determined. Referring again to FIG. 4, for each of the ten shade levels (SL) from 0 to 900 in the chart 430, the corresponding light mode lightness is:

$$\text{LM\_LIGHTNESS} = ((900 - SL))/1000 + M \quad \text{(Eq. 2)}$$

If the LM_LIGHTNESS for any shade level is greater than 0.97, the value is set to 0.97 to prevent the lightest shade from becoming too white. Similarly, if the LM_LIGHTNESS for any shade level is less than 0.05, the value is set to 0.05 to prevent the darkest shade from becoming too dark.

Dark mode shades for the input color are determined in a similar way, although a reduction factor is used rather than a multiplier. In general, dark mode shade adjustments are computed by decreasing the lightness is such a way that light shades are reduced more than the dark shades. For instance, the reduction value (REDUCTION_VALUE) may be calculated according to the following equation:

$$REDUCTION\_VALUE = (900 - SHADE\_LEVEL)/1000 \qquad \text{(Eq. 3)}$$

Once the reduction value is determined, the individual lightness values for each dark mode shade (DM_LIGHTNESS) can be determined. Referring again to FIG. 4, for each of the ten shade levels (SL) from 0 to 900 in the chart 430, the corresponding dark mode lightness is:

$$DM\_LIGHTNESS = (((900 - SL)/1000) - (.075 * \qquad \text{(Eq. 4)}$$
$$REDUCTION\_VALUE)$$

Once the light and dark mode shades have been determined, each shade is then checked against default light and dark text to determine which has a higher contrast with respect to the shade. If the higher-contrast text results in a contrast ratio is greater than the minimum value indicated by the desired WCAG 2.1 conformance level (e.g., 4.5:1), then that text may be designated as the on-color for that shade whenever the shade is used during content creation. Alternatively, if the higher-contrast text for a given shade does not have a contrast-ratio greater than the minimum value required, the shades service may incrementally lighten (for dark text) or darken (for light text) the shade to increase the contrast until the minimum contrast ratio is met.

Lastly, if any of the ten light mode shades or the ten dark mode shades were lightened or darkened to increase contrast, the shades service may smooth out the transitions through the ten shades so there are no excessive lightness jumps between adjacent shades. For example, the shades service of subsystem 311 may place the lightened or darkened shade along a gradient between the lightest and darkest shades and updating the intervening shades in each direction at equal percentage intervals.

Turning to subsystem 312, a gradients service may be provided. At a high level, the gradients service is a molecule generation service that, given an indication of the colors that will be used for a given theme (e.g., primary, secondary, tertiary colors), applies a set of logical instructions for the selection of gradient colors and a complementing set of text and icons colors, such that all text and icons placed over the gradient, with all its varying shades, meet the minimum designated contrast ratio.

Beginning with light mode, the gradients service may present an option for a designer to select a first color (the "A" color) for a gradient. In this regard, the range of selectable options may include each light mode shade that was calculated by the shades service of subsystem 311, for each of the input colors indicated by the designer. For instance, if the designer selected three colors (e.g., a primary, secondary, and tertiary color), then the gradients service of subsystem 312 would present the corresponding thirty light modes shades from which to select an A color for the gradient.

Once the A color is selected, the gradients service will limit the selection of a second color (the "B" color) for the gradient to those shades that have the same on-color as the A color. For instance, if the A color for the gradient has an on-color corresponding to dark text, only shades that have the same on-color (e.g., as designated by the shades service) may be selected for the B color. This ensures that any text or icon that is used on the gradient will meet the required contrast ratio across the full gradient.

For dark mode, the gradients service will first determine whether the A color and the B color selected for light mode are shades of the same color and both shade 600 of higher, referring again to the chart 430. If so, the gradients service will identify dark on-colors and proceed to map the same jump in shade values that the user selected in light mode. If there are not two or more dark on-color shades, then the gradients service will build a gradient from light on-color shades using the same jump in shades that was used in light mode. In this way, the gradients service will generate gradients in dark mode that are not too light and have the same on-color so as to maintain a compliant contrast ratio.

Turning to subsystem 313, an icons and buttons service may be provided. At a high level, the icons and buttons service is a molecule generation service that, given an indication of the colors that will be used for a given theme (e.g., primary, secondary, tertiary colors) and the light mode and dark mode background colors, applies a set of logical instructions for selecting icon and button colors that are limited to those colors that will meet the minimum designated contrast ratio against their background.

Beginning with light mode, the icons and buttons service may present an option for a designer to select a button color. In this regard, the baseline range of selectable options may include each light mode shade that was calculated by the shades service of subsystem 311, similar to the gradients service. However, the options will be limited to only those shades that meet the required contrast against the secondary light mode background color (e.g., 3:1 for WCAG 2.1 compliance level AA). In this regard, the secondary light mode background is slightly darker than the primary light mode background. The same logic can be used for the selection of an icon color in light mode.

For dark mode, the icons and buttons service will first use the designer's selected light mode button color and test its contrast against the primary dark mode background. If the button meets the required contrast ratio, then it may be used for dark mode as well. If the button does not meet the required contrast ratio, the icons and buttons service may incrementally test lighter shades of the selected color to find a shade with the appropriate contrast ratio. The same logic can be used for the selection of an icon color in dark mode, beginning from the light mode icon color selection.

Turning to subsystem 314, an elevations service may be provided. At a high level, the elevations service is an atom generation service that applies logic for creating respective sets of ten elevations for light mode and dark mode based on a designer's input for a desired box shadow styling.

In light mode, elevations are represented with increasing dropshadows to give the impression of height for elements in a two-dimensional interface. To determine the elevations, the elevations service receives input from a designer about the base dropshadow, including the color of the shadow, the horizontal offset distance, the vertical offset distance, blur, spread, and opacity. The designer further specifies the desired change between elevations. Based on this information, the elevations service determines ten consistently increasing dropshadow styles to represent the ten elevations in light mode.

In dark mode, elevations are created by applying a white overlay to the background color, where increasing elevations are represented by increasing lightness. The elevations service will set the background color as the baseline, elevation "zero" shade then apply an increasing white overlay to generate ten shades corresponding to increasing dark mode elevation.

Turning to subsystem 315, a minimum click area control service may be provided. At a high level, the minimum click area control service is an atom generation service that applies the logic for defining a design system's minimum click area (e.g., in pixels) for pointer inputs. For example, WCAG 2.1 compliance level AA requires a minimum click area of 24 pixels or higher for desktop applications and 44 pixels for tablet and mobile applications.

Accordingly, the minimum click area control service receives input from a designer to set the minimum click area for a design, and will increase the minimum click area by default if the value input by the designer does not meet the minimum requirements (e.g., 24 pixels for desktop, 44 pixels for tablet and mobile applications). In addition, the minimum click area control service may include logic for creating buttons and chips that appear visually smaller than the minimum required click area, but nonetheless meet the click area requirements. For instance, in the context of a mobile application with a minimum click area of 40 pixels, a small button that has a visual appearance that is only 28 pixels tall may be contained within a clickable area that is 44 pixels tall, with 8 pixels of padding on the top and bottom of the button. This feature advantageously allows the designer to create visually smaller elements that are less overwhelming in an interface while still meeting accessibility guidelines.

Turning to subsystem 316, a color theme service may be provided. At a high level, the color theme service is a template generation service that, given a previously created template and a new set of desired colors, applies a set of logical instructions for generating a new template that changes only the coloring of the elements in the resulting instrument.

For example, a designer may specify a color theme including primary, secondary and tertiary colors, light and dark mode backgrounds, gradients, buttons, icons, and text gradient colors, as generally discussed with respect to some of the services above. Based on this input data, new light and dark mode themes according to the new color theme may be generated for any existing template. Advantageously, the color theme service may be used to develop a dark mode for an existing template that did not previously have a dark mode, or to otherwise darken an existing template to reduce eye strain while maintaining required contrast levels. In this regard, the color theme service may also adjust the brightness of images by adding on a desaturation layer (a black layer with an opacity of 5%) over the image.

Turning to subsystem 317, a hotlinks service may be provided. At a high level, the hotlinks service is an atom generation service that applies logic for the generation of selectable hotlinks (or hyperlinks) that are discernible to meet a designated accessibility compliance guideline. For example, WCAG 2.1 conformance level AA requires that hotlinks have a contrast ratio of 3.1:1 against the background as well as a contrast ratio of 3.1:1 against the surrounding text if the link is not underlined. The hotlinks service also includes logic for handling various other complexities related to hotlink state and appearance.

The WCAG 2.1 requirements noted above apply in both light mode and dark mode. Further, links need to change on hover and and have a visual distinguishing effect, other than the color change, on focus. To satisfy these requirements, the hotlinks service initially allows a designer to pick the default settings or apply link coloring that compliments his or her theme. The designer can choose whether links are initially underlined or not. However, if the hotlinks service cannot find a color that meets the contrast criteria for both the background and the surrounding text, the hotlinks service will underline the links to stay compliant with the accessibility standards. Further, if hotlinks do not start underlined, then on hover and focus they will become underlined to meet the visual change requirements. Conversely, if hotlinks start underlined, then the underline is removed on hover and focus to meet the visual change requirement.

Turning to subsystem 318, a focus state service may be provided. At a high level, the focus state service is an instrument generation service that applies logic for creating a focus state for clickable interface items (e.g., buttons), the focus state including a visual indicator with a contrast of 3.1:1 against the background, as required by WCAG 2.1 conformance level AA.

To satisfy the requirements noted above, the focus state service may initially let a designer specify the default browser settings designed for focus states or the identified button color for focus states for interfaces with typical backgrounds in light mode (e.g., white/off-white or near-black/off-black) and dark mode (e.g., nearblack/off-black). However, the focus state service may overwrite these default settings if the designer selected a colored background in light or dark mode. Under these circumstances, the focus state service may select the color that was used for hotlinks, which provides the required contrast.

Turning to subsystem 319, a bevels service may be provided. At a high level, the bevels service is an atom generation service that applies logic for creating varying bevels, reverse bevels, and inset shadow effects based on user input. Bevels are similar to elevations and add the visual effect of 3D depth to a graphic or text object by making a light shadow on the top and left side of a shape and a dark shadow on the right and bottom side of a shape. An inverse bevel applies a dark shadow to the top and right side of a shape making it look three dimensionally recessed.

To determine the bevels, the bevels service receives input from a designer about the base the horizontal offset distance, the vertical offset distance, blur, spread, opacity level of the dark shadow, and opacity level of the light shadow. Based on this information, the bevels service determines ten bevels of consistently increasing height as well as ten reverse bevels of consistently increasing depth.

The additional subsystems 320 of the computing system 310 may run any number of additional design services similar to those discussed above, corresponding to any number of atomic design elements and/or accessibility compliance criteria.

Figure 5:
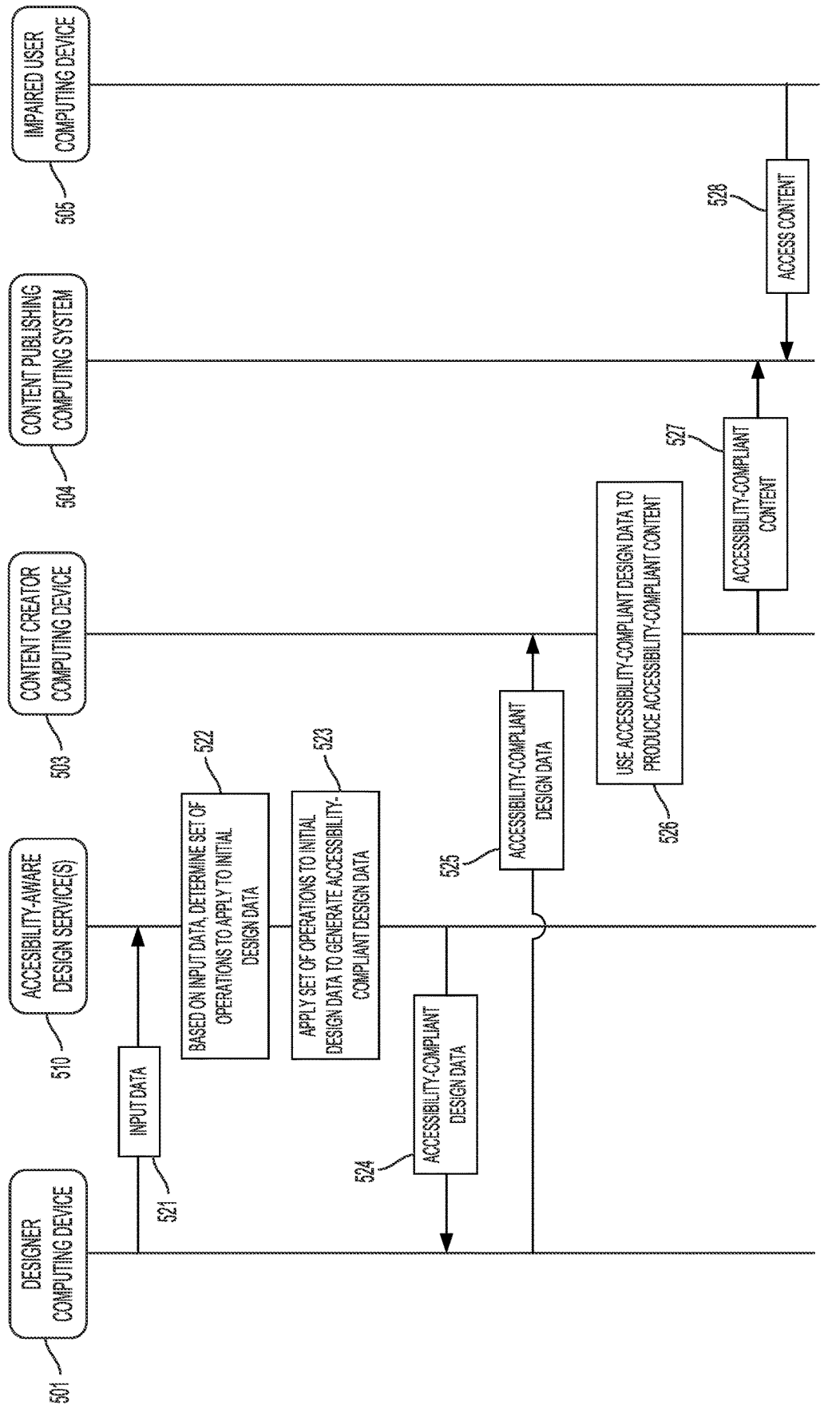
FIG. 5 depicts a functional block diagram for utilizing accessibility-aware design services for the creation of accessibility-compliant content, according to an example implementation.

Turning to FIG. 5, a functional block diagram is shown that depicts example operations for utilizing a set of accessibility-aware design services for the creation of accessibility-compliant content. At a high level, FIG. 5 includes various communications and operations that may be carried out by a designer computing device 501, one or more accessibility-aware design services 510, a content creator computing device 503, a content publishing computing system 504, and an impaired person computing device 505.

The designer computing device 501, the content creator computing device 503, the content publishing computing system 504, and the impaired person computing device 505 may generally correspond to the like devices shown in FIG. 1 and discussed above. Further, the accessibility-aware design services 510 may resemble one or more of the services shown in FIG. 3 and discussed above, and may be run by one or more subsystems similar to the subsystems 311-320.

Beginning at block 521, the designer computing device 501 may transmit input data to the accessibility-aware design services 510. In this regard, the designer computing device 501 may resemble the designer computing device 201 shown in FIG. 1. Accordingly, some of the input data may be the same types of initial design data discussed above that is used to define the design language for content creation, such as colors, fonts, shapes, etc. Further, in the example shown in FIG. 5, the input data may additionally include an indication of a target accessibility compliance standard. For instance, the input data may indicate that WCAG 2.1 compliance level AA is desired for the content that will eventually be created.

In still further examples, the input data provided by the designer computing device 501 may provide an indication of a specific type of impairment for which the designer is trying to create accessible content, and for which there may be unique accessibility considerations and design guidelines that are not present for other types of impairments. Other examples are also possible.

At block 522, based on the input data received from the designer computing device 501, the accessibility-aware design services 510 may determine a set of operations to apply to the initial design data that was provided by the designer as part of the input data. As noted above, the set of operations to be applied to the initial design data may be determined based on various factors. As one possibility, the target accessibility compliance standard included as part of the input data may dictate various minimum standards for contrast ratios, clickable areas, and the like, which in turn may affect the operations that are to be performed on the initial design data.

As another possibility, in situations where the input data received from the designer computing device 501 included an indication of a particular impairment, the accessibility-aware design services 510 may determine a set of operations that are specific to the particular impairment. As one possibility, if the input data includes an indication of a certain type of color blindness, a light and dark mode shade service of the accessibility-aware design services 510 may restrict the colors and shades that may be selected for certain types of content.

At block 523, the accessibility-aware design services 510 may apply the determined set of operations to the initial design data and thereby generate accessibility-compliant design data. The accessibility-compliant design data may take various forms, but notably, might not yet include a rendered representation of the content that is the eventual goal of the design. Rather, the accessibility-compliant design data may take the form of a cascading style sheet (CSS) file or a javascript object notation (JSON) file that may be usable—by the designer or another user in an interface design tool or the like—to produce the accessibility-compliant design.

At block 524, the accessibility-aware design services 510 may transmit the accessibility-compliant design data to the designer computing device 501. For instance, as the designer computing device 501 accesses the various accessibility-aware design services 510, the outputs of the services may be generated as CSS or JSON files that are provided to the designer computing device 501. As another possibility, the accessibility-aware design services 510 may be embedded within an interface design tool that is installed on the designer computing device 501, such that the blocks 521-524 of FIG. 5 all take place within the context of the same device.

At block 525, the designer computing device 501 may transmit the accessibility-compliant design data to the content creator computing device 503. Although this is shown as a direct communication in FIG. 5, it is also possible that one or more intermediate computing devices and/or logical entities may be included as well. For example, the designer computing device 501 may post the accessibility-compliant design data to a repository or the like where it can be retrieved by the content creator computing device 503, among other developers and/or creators. As another possibility, the accessibility-aware design services 510 might deposit the accessibility-compliant design data into a repository as an alternative to transmitting the data to the designer computing device. Other arrangements are also possible.

By way of comparison to FIG. 1, it will be appreciated that the accessibility-compliant design data referenced in FIG. 5 was generated to be accessibility-compliant starting from its most fundamental design elements (e.g., atoms and molecules) and was built progressively from there. Accordingly, the content creator who receives the data at block 525—or any other user who obtains the accessibility-compliant design data—is able to produce compliant content according to the defined design language established by the designer and with minimal additional consideration of accessibility standards.

At block 526, the content creator computing device 503 may use the accessibility-compliant design data to produce accessibility-compliant design content. For instance, the content creator may load the accessibility-compliant design data into a desktop publishing tool, an interface design tool, or the like. Then, the content creator may generate and render the content according to the designed standards, building compliant molecules into compliant organisms, compliant organisms into compliant templates, and compliant templates into compliant instruments.

At block 527, the content creator computing device 503 may cause the accessibility-compliant design content to be published via the content publishing computing system 504. For example, the content creator may publish rendered web content to a web hosting service or publish mobile application content to an app store for distribution. As yet another possibility involving physical media, the content creator may cause a printing vendor to generate physical copies of items (e.g., menus, tickets, credit cards, etc.) that include the rendered content. Various other examples are also possible.

Lastly, at block 528, an impaired person may use the computing device 505 to access and consume the accessibility-compliant design content via the content publishing computing system 504. For example, the impaired person may access a website and/or download and install a mobile application that contains the accessibility-compliant design content.

FIG. 5 includes one or more operations, functions, or actions as illustrated by one or more operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts and communication diagrams shown in FIG. 5 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

Figure 6:
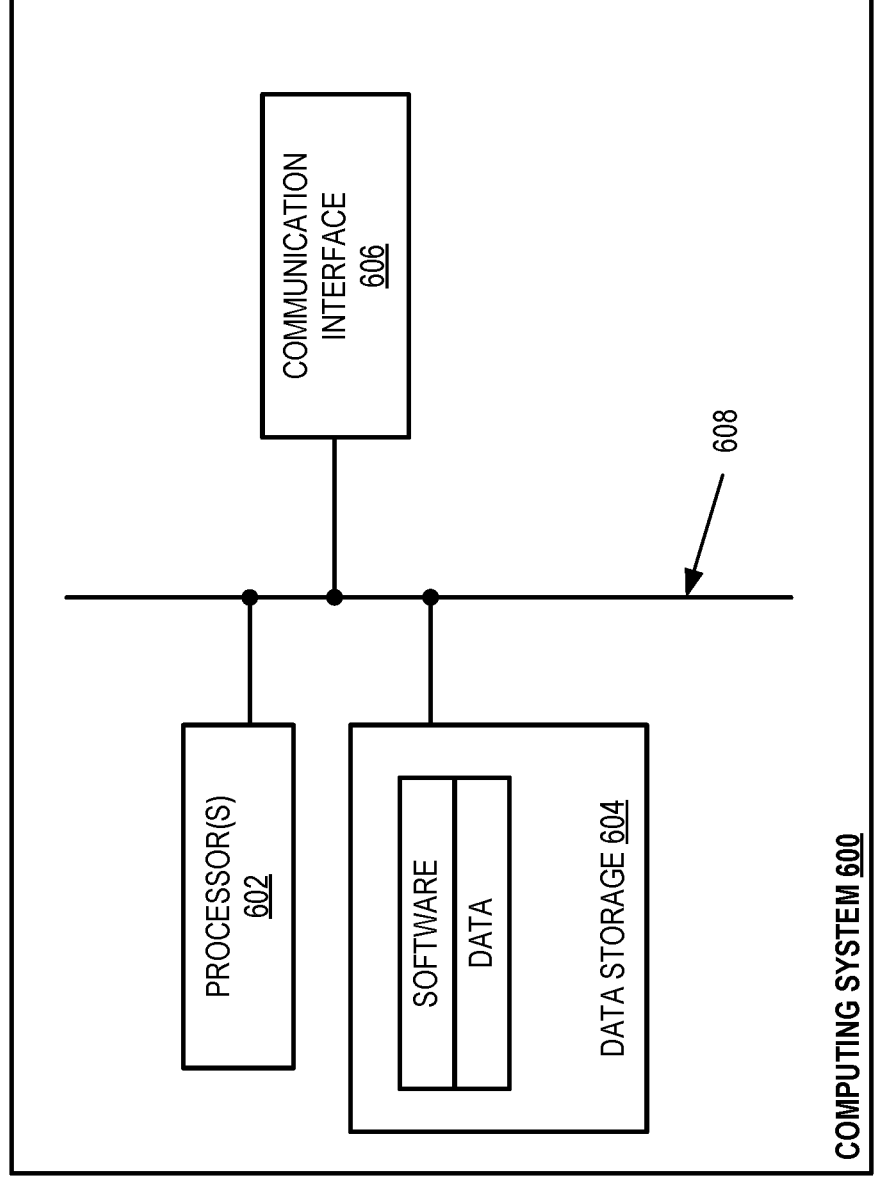
FIG. 6 is a simplified block diagram that illustrates some structural components that may be included in an example computing system.

Turning now to FIG. 6, a simplified block diagram is provided to illustrate some structural components that may be included in an example computing system 600. For example, computing system 600 may implement one or more of the software subsystems 311-320 shown in FIG. 3 and/or the accessibility-aware design services 510 shown in FIG. 5 and may be configured to carry out any of the various subsystem functions disclosed herein, including but not limited to the functions included in the example data flows described with reference to FIG. 5. At a high level, computing system 600 may generally comprise any one or more computer systems (e.g., one or more servers) that collectively include at least a processor 602, data storage 604, and a communication interface 606, all of which may be communicatively linked by a communication link 608 that may take the form of a system bus, a communication network such as a public, private, or hybrid cloud, or some other connection mechanism. Each of these components may take various forms.

For instance, processor 602 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 602 could comprise processing components that are distributed across a plurality of physical computing devices connected via a network, such as a computing cluster of a public, private, or hybrid cloud.

In turn, data storage 604 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 6, data storage 604 may be capable of storing both (i) program instructions that are executable by processor 602 such that the computing system 600 is configured to perform any of the various functions disclosed herein, and (ii) data that may be received, derived, or otherwise stored by computing system 600.

Communication interface 606 may take the form of any one or more interfaces that facilitate communication between computing system 600 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

It should be understood that computing system 600 is one example of a computing system that may be used with the embodiments described herein. Numerous other arrangements are possible and contemplated herein. For instance, other computing systems may include additional components not pictured and/or more or less of the pictured components.

Figure 7:
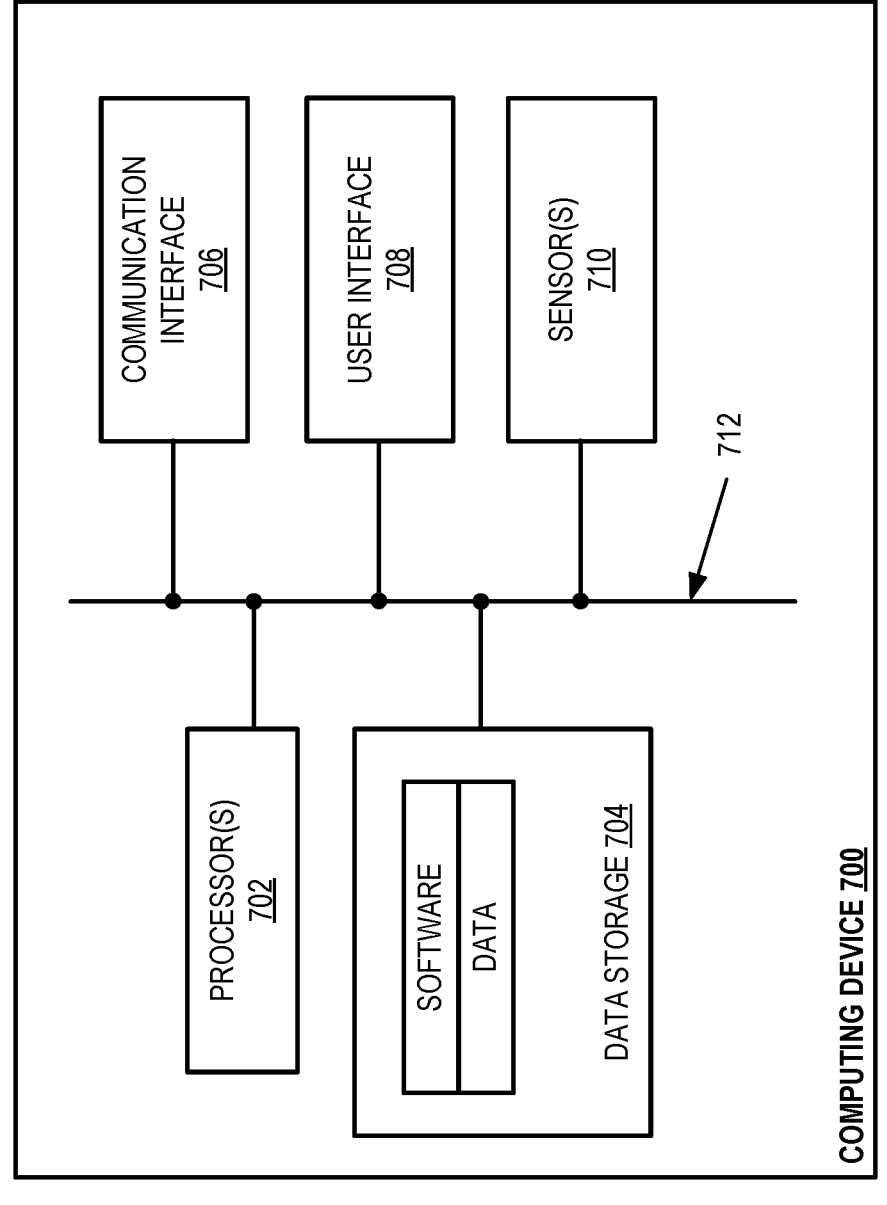
FIG. 7 is a simplified block diagram that illustrates some structural components that may be included in an example computing device.

Turning now to FIG. 7, a simplified block diagram is provided to illustrate some structural components that may be included in an example computing device 700. For example, computing device 700 could serve as one or more of the computing devices 401, 403, and/or 405 shown in FIG. 4 and may be configured to carry out any of the various computing device functions disclosed herein-including but not limited to the functions performed by the computing devices 401, 403, and/or 405 in the functional block diagram described with reference to FIG. 4. At a high level, computing device 700 may generally comprise a processor 702, data storage 704, a communication interface 706, a user interface 708, one or more sensors 710, all of which may be communicatively linked by a communication link 712 that may take the form of a system bus or some other connection mechanism. Each of these components may take various forms.

For instance, processor 702 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 702 could comprise processing components that are distributed across a plurality of physical computing devices connected via a network, such as a computing cluster of a public, private, or hybrid cloud.

In turn, data storage 704 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 704 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 7, data storage 704 may be capable of storing both (i) program instructions that are executable by processor 702 such that the computing device 700 is configured to perform any of the various functions disclosed herein, and (ii) data that may be received, derived, or otherwise stored by computing device 700.

Communication interface 706 may take the form of any one or more interfaces that facilitate communication between computing device 700 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols (e.g., Bluetooth, near field communications (NFC), ultra-wideband (UWB)), among other possibilities.

The computing device 700 may additionally include a user interface 708 for connecting to user-interface components that facilitate user interaction with the computing device 700, such as a keyboard, a mouse, a trackpad, a display screen, a touch-sensitive interface, a stylus, a virtual-reality headset, and/or speakers, among other possibilities.

The computing device 700 may additionally include one or more sensors 710 for obtaining various different types of data that may facilitate user interaction with the computing device 700 or other computing device functions, such as a camera, a microphone, and/or a fingerprint sensor, among other possibilities.

It should be understood that computing device 700 is one example of a computing device that may be used with the embodiments described herein. Numerous other arrangements are possible and contemplated herein.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "consumers," "holders," "users" or other entities, this is for purposes of example and explanation only. The claims should not be construed as requiring action by such actors unless explicitly recited in the claim language.

We claim:

1. A computing system comprising:
a network interface for communicating over at least one data network;
at least one processor;
at least one non-transitory computer-readable medium; and
program instructions stored on the at least one non-transitory computer-readable medium that, when executed by the at least one processor, cause the computing system to:
receive, from a computing device, input data indicating:
a target accessibility compliance standard for creating accessibility-compliant content accessible to persons with visual impairments; and
initial design data indicating at least one color for at least one visual interface design element;
based on the target accessibility compliance standard, determine a set of operations to apply to the initial design data to generate accessibility-compliant design data comprising a cascading style sheet (CSS) file or a javascript object notation (JSON) file for the at least one visual interface design element;

execute the set of operations using the initial design data to generate the accessibility-compliant design data, wherein generating the accessibility-compliant design data comprises:
for the at least one color, generating (i) a first set of different light mode shades and (ii) a second set of different dark mode shades; and
for each different shade in the first set and the second set of shades, determining a respective on-color compliant with the target accessibility compliance standard; and
based on the accessibility-compliant design data:
cause the computing device to render, on a display, based on the accessibility-compliant design data, a plurality of the different light mode and dark mode shades in association with their respective on-color, each given shade and respective on-color pairing configured to produce accessibility-compliant content for the at least one visual interface design element; and
cause the computing device to render, on the display, given accessibility-compliant content for the at least one visual interface design element, wherein the given accessibility-compliant content comprises (i) first content having a given shade of the different light mode or dark mode shades and (ii) second content, displayed on top of the first content, having the respective on-color for the given shade.

2. The computing system of claim 1, wherein the input data further comprises a target compliance level for the target accessibility compliance standard.

3. The computing system of claim 1, wherein the input data further comprises an indication of at least one user impairment, and wherein the accessibility-compliant design data is usable to produce, for the at least one visual interface design element, accessibility-compliant content for the at least one user impairment.

4. The computing system of claim 3, wherein the at least one user impairment comprises one or more of a given vision impairment, a hearing impairment, a learning impairment, a motion impairment, or a cognition impairment.

5. The computing system of claim 1, further comprising program instructions that, when executed by the at least one processor, cause the computing system to:
determine the initial design data for the at least one visual interface design element is not compliant with the target accessibility compliance standard, wherein the program instructions that, when executed by the at least one processor, cause the computing system to execute the set of operations using the initial design data to generate the accessibility-compliant design data comprise program instructions that, when executed by the at least one processor, cause the computing system to:
update the initial design data for the at least one visual interface design element to be the accessibility-compliant design data compliant with the target accessibility compliance standard.

6. The computing system of claim 1, wherein the program instructions that, when executed by the at least one processor, cause the computing system to execute the set of operations using the initial design data to generate the accessibility-compliant design data comprise program instructions that, when executed by the at least one processor, cause the computing system to:

use the initial design data for the at least one visual interface design element to derive additional design information for one or more additional visual interface design elements.

7. A non-transitory computer-readable medium, wherein the non-transitory computer-readable medium is provisioned with program instructions that, when executed by at least one processor, cause a computing system to:

receive, from a computing device, input data indicating:

a target accessibility compliance standard for creating accessibility-compliant content accessible to persons with visual impairments; and initial design data indicating at least one color for at least one visual interface design element;

based on the target accessibility compliance standard, determine a set of operations to apply to the initial design data to generate accessibility-compliant design data comprising a cascading style sheet (CSS) file or a javascript object notation (JSON) file for the at least one visual interface design element;

execute the set of operations using the initial design data to generate the accessibility-compliant design data, wherein generating the accessibility-compliant design data comprises:

for the at least one color, generating (i) a first set of different light mode shades and (ii) a second set of different dark mode shades; and for each different shade in the first set and the second set of shades, determining a respective on-color compliant with the target accessibility compliance standard; and based on the accessibility-compliant design data:

cause the computing device to render, on a display, based on the accessibility-compliant design data, a plurality of the different light mode and dark mode shades in association with their respective on-color, each given shade and respective on-color pairing configured to produce accessibility-compliant content for the at least one visual interface design element; and cause the computing device to render, on the display, given accessibility-compliant content for the at least one visual interface design element, wherein the given accessibility-compliant content comprises (i) first content having a given shade of the different light mode or dark mode shades and (ii) second content, displayed on top of the first content, having the respective on-color for the given shade.

8. The non-transitory computer-readable medium of claim 7, wherein the input data further comprises a target compliance level for the target accessibility compliance standard.

9. The non-transitory computer-readable medium of claim 7, wherein the input data further comprises an indication of at least one user impairment, and wherein the accessibility-compliant design data is usable to produce, for the at least one visual interface design element, accessibility-compliant content for the at least one user impairment.

10. The non-transitory computer-readable medium of claim 9, wherein the at least one user impairment comprises one or more of a given vision impairment, a hearing impairment, a learning impairment, a motion impairment, or a cognition impairment.

11. The non-transitory computer-readable medium of claim 7, further comprising program instructions that, when executed by the at least one processor, cause the computing system to:

determine the initial design data for the at least one visual interface design element is not compliant with the target accessibility compliance standard, wherein the program instructions that, when executed by at least one processor, cause the computing system to execute the set of operations using the initial design data to generate the accessibility-compliant design data comprise program instructions that, when executed by at least one processor, cause the computing system to:

update the initial design data for the at least one visual interface design element to be the accessibility-compliant design data compliant with the target accessibility compliance standard.

12. The non-transitory computer-readable medium of claim 7, wherein the program instructions that, when executed by at least one processor, cause the computing system to execute the set of operations using the initial design data to generate the accessibility-compliant design data comprise program instructions that, when executed by at least one processor, cause the computing system to:

use the initial design data for the at least one visual interface design element to derive additional design information for one or more additional visual interface design elements.

13. A method carried out by a computing system, the method comprising:

receiving, from a computing device, input data indicating:

a target accessibility compliance standard for creating accessibility-compliant content accessible to persons with visual impairments; and initial design data indicating at least one color for at least one visual interface design element;

based on the target accessibility compliance standard, determining a set of operations to apply to the initial design data to generate accessibility-compliant design data comprising a cascading style sheet (CSS) file or a javascript object notation (JSON) file for the at least one visual interface design element;

executing the set of operations using the initial design data to generate the accessibility-compliant design data, wherein generating the accessibility-compliant design data comprises:

for the at least one color, generating (i) a first set of different light mode shades and (ii) a second set of different dark mode shades; and for each different shade in the first set and the second set of shades, determining a respective on-color compliant with the target accessibility compliance standard; and based on the accessibility-compliant design data:

causing the computing device to render, on a display, based on the accessibility-compliant design data, a plurality of the different light mode and dark mode shades in association with their respective on-color, each given shade and respective on-color pairing configured to produce accessibility-compliant content for the at least one visual interface design element; and causing the computing device to render, on the display, given accessibility-compliant content for the at least one visual interface design element, wherein the given accessibility-compliant content comprises (i) first content having a given shade of the different light mode or dark mode shades and (ii) second content, displayed on top of the first content, having the respective on-color for the given shade.

14. The method of claim 13, wherein the input data further comprises an indication of at least one user impairment, the at least one user impairment comprising one or more of a given vision impairment, a hearing impairment, a learning impairment, a motion impairment, or a cognition impairment, and wherein the accessibility-compliant design data is usable to produce, for the at least one visual interface design element, accessibility-compliant content for the at least one user impairment.

* * * * *